United States Patent [19]

van der Lely

[11] Patent Number: 4,651,512
[45] Date of Patent: Mar. 24, 1987

[54] BALER

[75] Inventor: Cornelis van der Lely, Zug, Netherlands

[73] Assignee: Texas Industries, Inc., Curacao, Netherlands

[21] Appl. No.: 676,298

[22] Filed: Nov. 29, 1984

[30] Foreign Application Priority Data

Dec. 1, 1983 [NL] Netherlands ............... 8304135

[51] Int. Cl.⁴ ............................................. A01D 85/00
[52] U.S. Cl. ........................................ 56/341; 56/364; 100/88
[58] Field of Search ............... 56/341, 343, 364; 100/88, 89, 5

[56] References Cited

U.S. PATENT DOCUMENTS 3,020,830  2/1962  Harrington ....................... 56/341
4,433,533  2/1984  Giani .............................. 56/341

FOREIGN PATENT DOCUMENTS 64116   11/1982  European Pat. Off. ............ 56/341
2353381 5/1975  Fed. Rep. of Germany ....... 56/341
2398448 3/1979  France ............................. 56/341
6713534 4/1969  Netherlands ...................... 56/341

Primary Examiner—Gene Mancene
Assistant Examiner—David I. Tarnoff
Attorney, Agent, or Firm—Penrose Lucas Albright

[57] ABSTRACT

A baler comprises two winding spaces disposed side-by-side. In use, a pick-up device picks up crop from a swath and feeds it to one of the spaces. A pivotable wall portion comprising powered rollers initiates winding of a bale and pivots upwardly about an axis as the bale grows. Other powered rollers surrounding the winding space assist in the formation of the bale. When the bale is complete it is bound with twine, a door is raised by a ram and the bale is discharged. As soon as winding of a bale in one of the spaces is complete, the pick-up device in whole or part is moved relatively laterally with respect to the winding spaces so that crop is then fed to the other winding space while the completed bale is bound and discharged.

4 Claims, 9 Drawing Figures

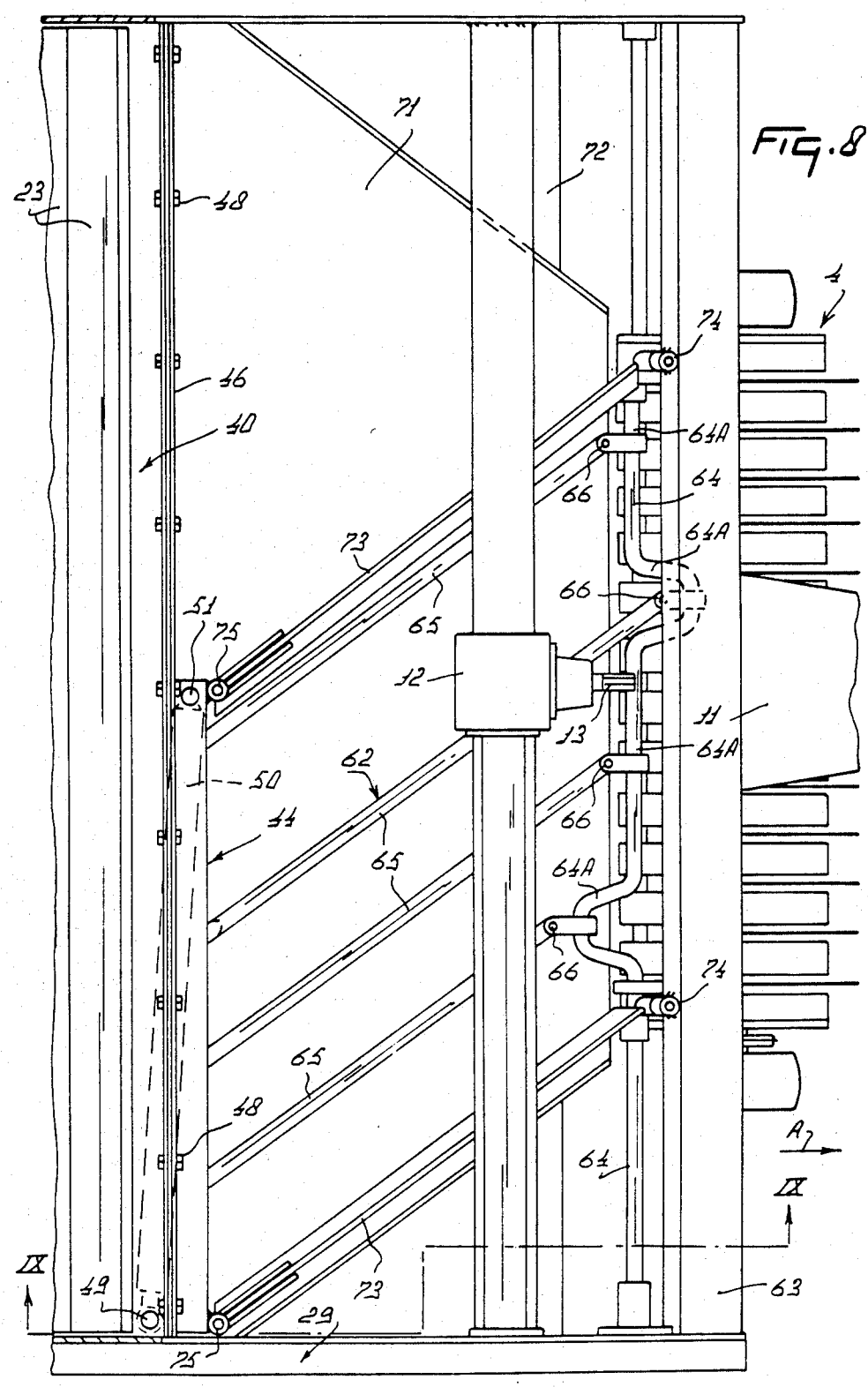

BALER

FIELD OF THE INVENTION

This invention relates to balers.

BACKGROUND AND PRIOR ART

A known baler comprises two baling chambers disposed one behind the other. In operation, a first bale is made ready in the rear chamber and deposited on the field, while at the same time a second bale is being formed in the front chamber. After the second bale has been wound to some extent in the front chamber, it is displaced from the front chamber into the rear chamber where, after the first bale has left the rear chamber winding is completed. In this way it was attempted to avoid the necessity of stopping the baler on the field to bind the bale with twine or wire, such binding operation being time-consuming. However the use of two chambers in such a baler has the disadvantage that part of the time available for the formation of a bale is required for displacing a partially complete bale from the front chamber into the rear chamber. This displacement also requires separate means which raises the costs of the baler without directly contributing to the formation or the binding of bales.

SUMMARY OF THE INVENTION

In accordance with one aspect of the present invention there is provided a baler comprising a pick-up device for picking up crop from the ground, and at least two chambers comprising winding spaces for forming bales, the winding spaces being disposed side by side and having substantially equal diameters.

In this way it can be ensured that both chambers can be constantly effectively operating to form and to bind a bale.

According to a second aspect of the present invention there is provided a baler comprising a pick-up device for picking up crop from the ground, and at least two chambers for forming bales, the chambers being filled with crop, in operation, one after the other, each chamber having, at one side, a side wall, the side walls of the chambers lying in different planes from each other.

According to a third aspect of the present invention there is provided a baler comprising a pick-up device for picking up crop from the ground, and at least one chamber comprising a winding space for forming bales, the rear of the winding space being provided with a wall having crop-displacing members and having a length corresponding approximately to the diameter of the winding space, the wall being pivotable about an axis situated near the top of the wall and about an axis near the bottom of the wall.

According to a fourth aspect of the present invention there is provided a baler comprising a pick-up device for picking up crop from the ground, and at least two chambers for forming bales, the pick-up device being laterally displaceable with respect to the chambers.

According to a fifth aspect of the present invention there is provided a baler comprising a pick-up device for picking up crop from the ground, at least two chambers for forming bales, and a crop feeding mechanism provided between the pick-up device and the chambers, the crop feeding mechanism being operative to feed crop to one chamber or the other.

According to a sixth aspect of the present invention there is provided a baler comprising a pick-up device for picking up crop from the ground, and at least one chamber for forming bales, control means for opening the chamber being disposed, as viewed on plan, between two side walls of the chamber.

BRIEF DESCRIPTION OF THE DRAWINGS

FIG. 8 is a sectional view taken on the line VIII—VIII in FIG. 6; and

DETAILED DESCRIPTION OF PREFERRED EMBODIMENTS

Figure 1:
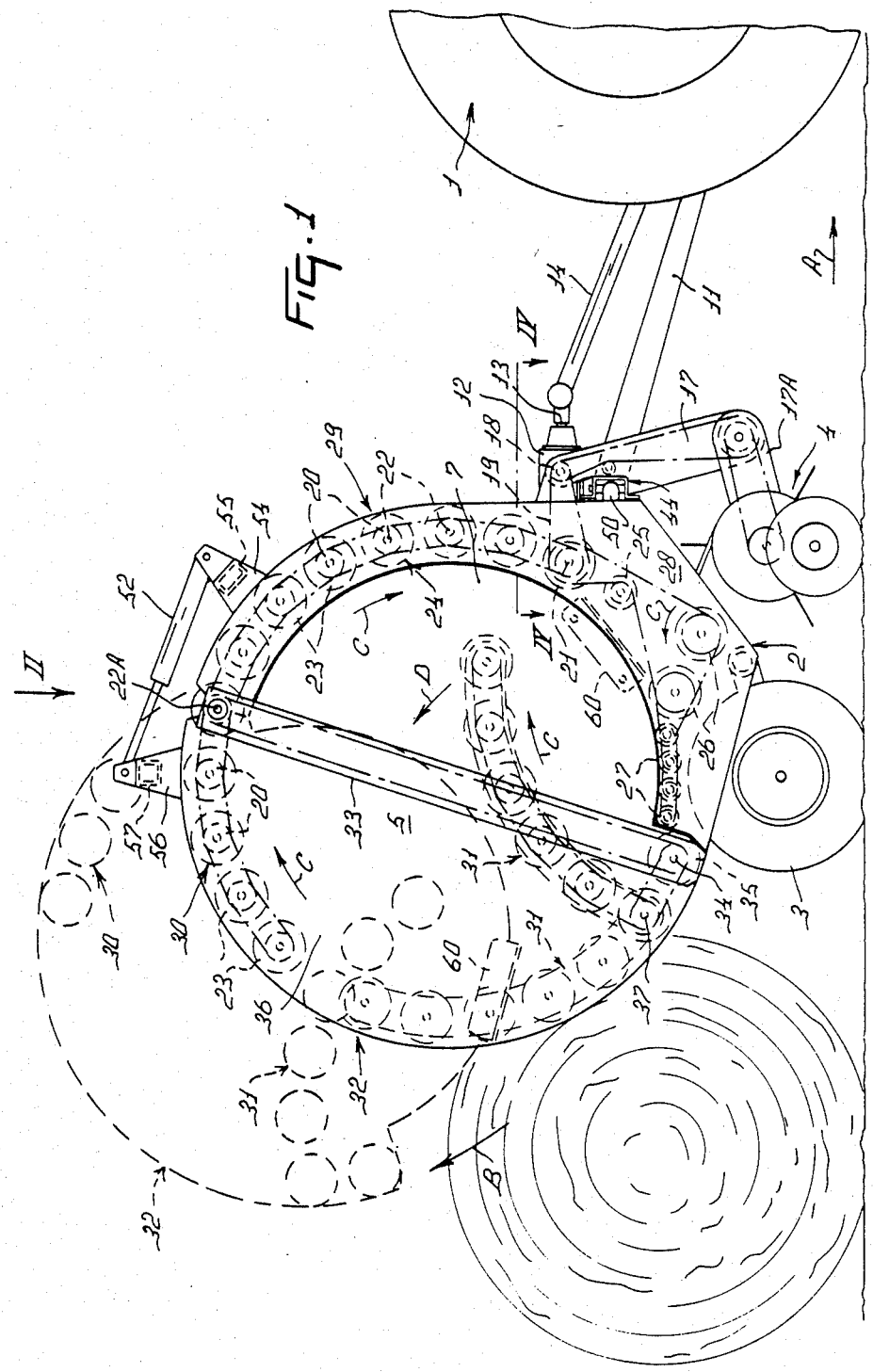
FIG. 1 is a side view of a baler.
Figure 2:
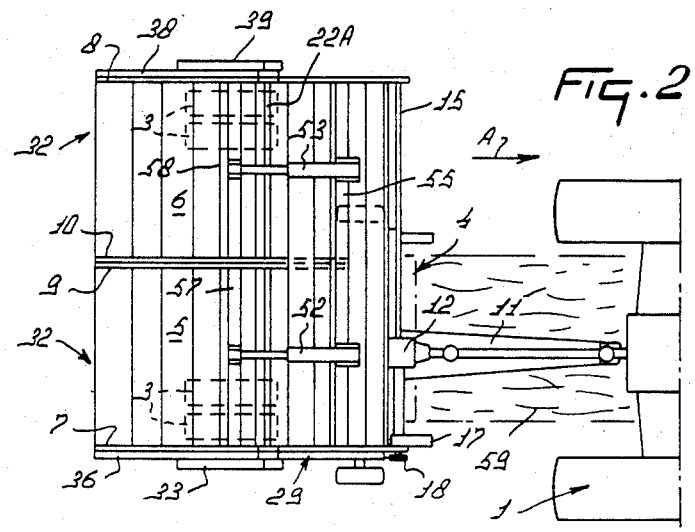
FIG. 2 is a plan view of the baler of FIG. 1 coupled with a tractor in a first working position.
Figure 3:
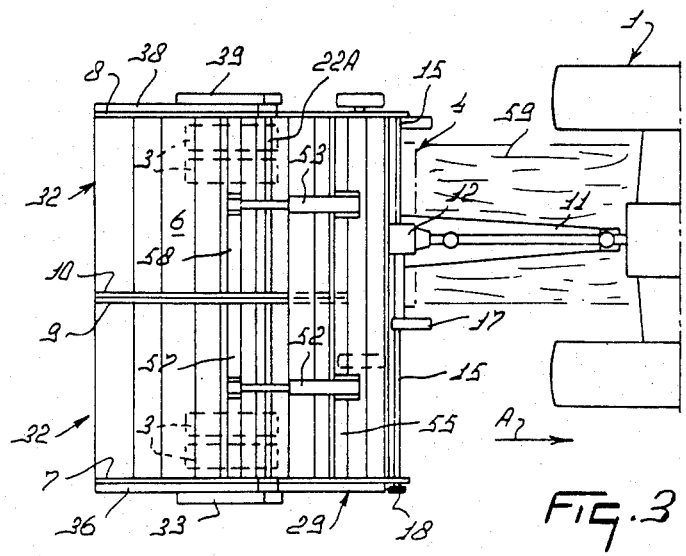
FIG. 3 corresponds to FIG. 2 but shows the baler in a second working position.

The baler shown in FIG. 1 is drawn by a tractor 1 and comprises a frame 2 supported by ground wheels 3 on each side of the baler. The baler has a pick-up device 4 of known kind, which feeds picked-up crop towards one of two chambers or winding spaces 5 or 6 (FIGS. 2,3). The winding spaces 5 and 6 are disposed side by side, with respect to the normal intended direction of operative travel A of the baler, and have the same circumferential shape and equal dimensions. The winding spaces 5 and 6 are bounded at their outboard sides by side walls 7 and 8 respectively and at their inboard sides by side walls 9 and 10. The inboard side walls 9 and 10 lie very close together and have the same dimensions as each other.

Figure 4:
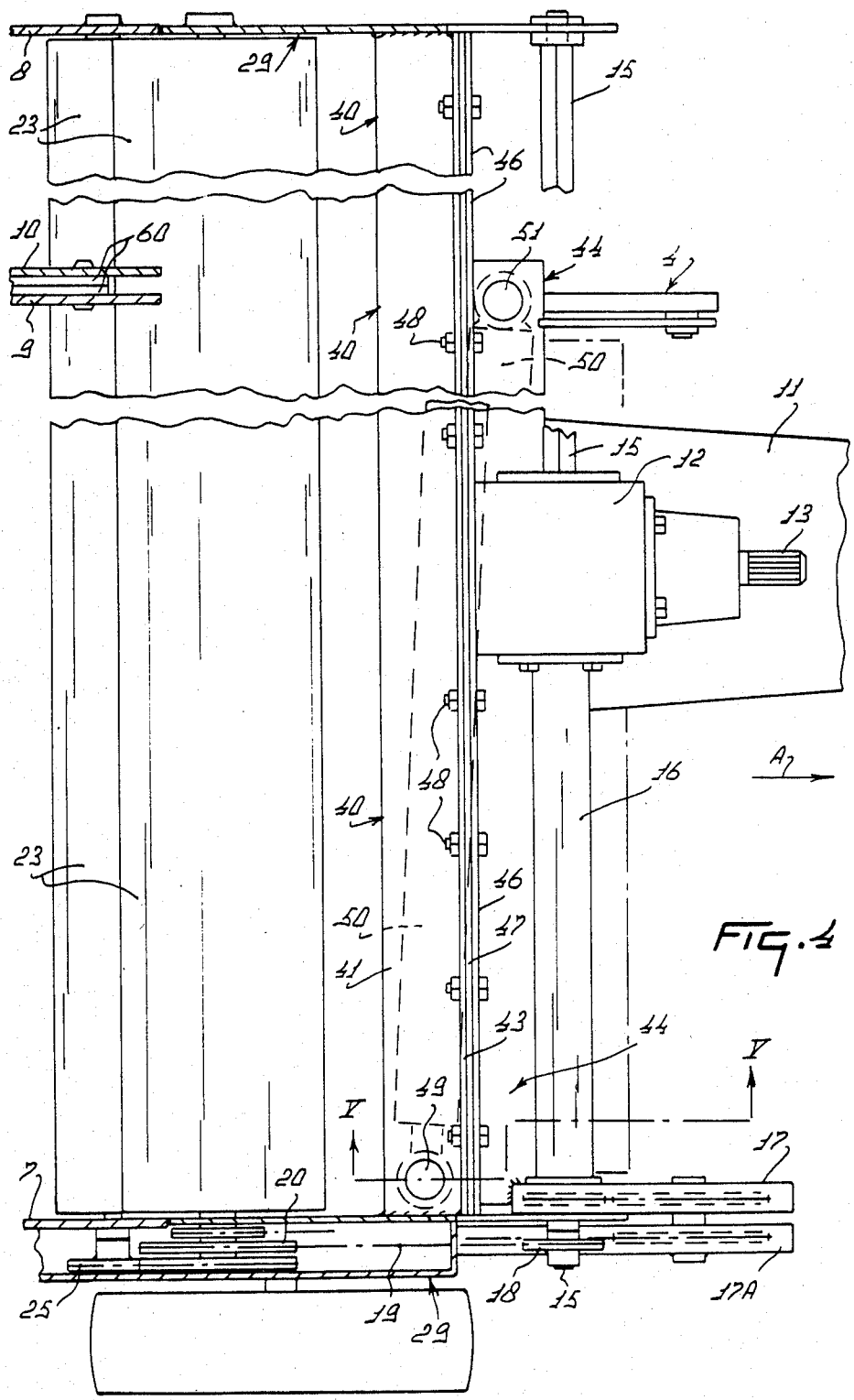
FIG. 4 is a sectional view taken on the line IV—IV in FIG. 1.
Figure 5:
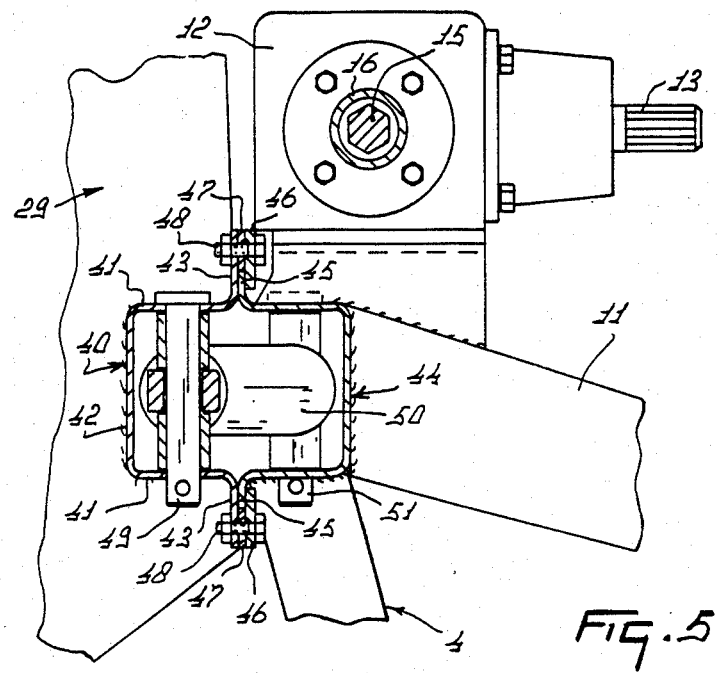
FIG. 5 is a sectional view taken on the lines V—V in FIG. 4.
Figure 6:
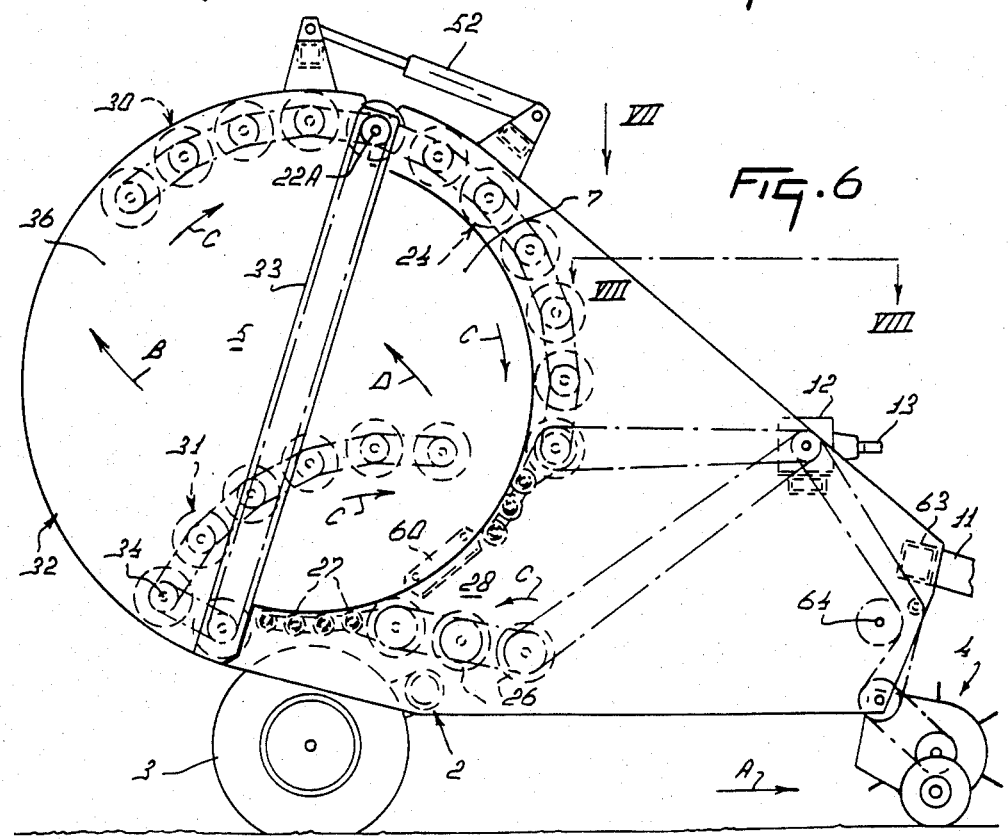
FIG. 6 is a sectional view of another baler.

The baler is hitched to the tractor 1 by a drawbar 11 which is connected by a substantially vertical pivotal shaft to a drawhook of the tractor. At the front, the baler has a drive casing 12 having an input shaft 13, which can be drivably connected by an auxiliary shaft 14 to a power take-off shaft of the tractor 1. The drive casing 12 has an output shaft 15 (FIGS. 2,5) which extends at right angles to the direction A towards the side of the baler which is visible in FIG. 1. The output shaft 15 has a solid cross-section which is shown in FIG. 5 as a regular hexagon, and is surrounded by a cylindrical tube 16 (FIGS. 4 and 5) which is rigidly secured at one end to the drive casing 12 and is rigidly secured at the other end near the side of the baler visible in FIG. 1, to a drive casing 17. The casing 17 extends downwards from the tube 16 to the front of the pick-up device 4. The drive casing 17 comprises a chain drive shown schematically in FIG. 1 for the pick-up device 4, this chain drive comprising a sprocket mounted on the shaft 15 inside the casing 17.

The shaft 15 extends through drive casing 17 and terminates at a drive casing 17A, which has a fixed position with respect to the frame 2. A sprocket 18 mounted on the shaft 15 drives through a chain 19, a sprocket 20 and its shaft 21, these being situated outside the side wall 7 of the baler. The shaft 21 extends across the width of the baler and is journalled on the other side of the baler in the side wall 8. The shaft 21 is disposed, as will be seen from FIG. 1, at the front of the two winding spaces 5 and 6. Further shafts 22 are arranged above the shaft 21 and parallel to it; these shafts 22 extend horizontally and transversely of the direction A and are all driven from the multiple sprocket 20. The shafts 22 also extend across the width of the baler and are journalled in both side walls 7 and 8. The chain drives between the shaft 21, adjacent shaft 22, and successive shafts 22 are short chain transmissions, as is shown in FIG. 1, which each cover only the distance between two adjacent shafts. On the shaft 21 and each of the shafts 22 are mounted crop displacing rollers 23, and a group 24 of these rollers 23 defines a front boundary of the two winding spaces 5 and 6 covering the whole width of the baler. The shaft 22 of a top roller 23 of the group 24 is separately designated by reference numeral 22A.

The chain drive continues downwardly, from the lowermost sprocket 20 of the group 24 and, as indicated in FIG. 1, drives an upper crop feeding roller 25, two adjacent lower crop feeding rollers 26 and four crop conveying rollers 27. The rollers 25 and 26 and the chain drive to them constitute a crop feeding mechanism for the two chambers 5 and 6. A space left between the bottom of the feeding roller 25 and the tops of the feeding rollers 26 forms an inlet opening 28 for the crop fed by the pick-up device 4. The crop conveying rollers 27 each have a diameter which is about half that of the group 24 because they are partly disposed above the ground wheels 3.

The group of rollers 24, rear roller 26 and the rollers 27 define the above-mentioned front boundary of the winding spaces 5 and 6, which boundary, as will be seen in the side view of FIG. 1, is substantially semi-circular. The feeding roller 25 lies outside this boundary, since it is driven in a different direction from that of each of the other rollers because of its feeding function. The group of rollers 24 and the rollers 26 and 27 are thus associated with the two winding spaces 5 and 6. The shafts of these rollers are journalled in a frame 29 which is arcuate as viewed from the side and an opposite arcuate frame plate 29 which are disposed one on each side of the baler and are interconnected by the shafts 22.

In contrast to the front boundary of the winding spaces 5 and 6, which is formed by the same rollers for the two spaces, the rear boundaries of the spaces 5 and 6 are separate from each other. The rollers forming the rear boundaries of the spaces 5 and 6 are, therefore, driven from the respective sides of the device. For this purpose drive is transmitted by the top shaft 22A of the group 24 from the side visible in FIG. 1 to the other side of the baler.

On each side of the baler, a group of rollers 30 is driven from the shaft 22A. Each group 30 extends from the shaft 22A, downwardly to the rear so as to continue as shown in FIG. 1, the cylindrical boundary defined by the group 24 and the rollers 27. The group of rollers 30 adjoining the roller 23 on the shaft 22A comprises four rollers extending between the side walls 7 and 9 of the winding space 5. At its lower rear end, the group of rollers 30 meets a group of rollers 31 which continues the circular, rear boundary of the space 5 and meets the rollers 27. The rotary shafts and the sprockets of the rollers of the groups 30 and 31 are journaled in the side walls 7 and 9 of the winding space 5 and together constitute a rearwardly and upwardly pivotable door 32 for discharging a completed bale from the baler. It should be noted that the side walls 7 and 9 extend to the front as far as the arcuate frame 29, in which the groups of rollers 24 and the rollers 25 to 27 are journalled. The side walls of the winding space 5, which are pivotable together with the door, thus occupy, as shown in the side view of FIG. 1, substantially the entire circular lateral boundaries of the winding space 5.

A chain drive 33 slopes downwards and rearwards from the shaft 22, for driving a shaft 34. The shaft 34 extends only between the side walls 7 and 9 of the winding space 5, in which side walls it is journalled. The shaft 34 carries a crop displacing roller 35, which also extends only between the side walls 7 and 9. From a sprocket on the shaft 34 located on the outboard side of the side wall 7, the rollers of the group 31 are driven by separate chain drives. The roller 34 is situated near the underside of the door 32 when it is closed. The lowermost roller of the group of rollers 31 forming a separate boundary wall is situated near the roller 35 and the topmost roller of the group 31 is situated a short distance behind and below the rearmost roller of the group 30. As shown in FIG. 1, the ends of the group 31 subtend an angle at the center of the winding space 5 of about 50° to 70°. The entire group of rollers 31 is pivotable about the axis of the rotary shaft 37 of the lowermost roller with respect to the other rollers and the side walls of the door 32. In this way, when the door is closed, the wall of group 31 can occupy the position indicated in FIG. 1 by broken lines, in which position downwards movement is limited by a stop (not shown). This position is reached under the weight of the group of rollers, but the weight of group 31 can partly be absorbed by means of a relief spring. The rotary shafts of the rollers of the group 31 are journalled in arcuate carriers arranged one at each end of the shafts and situated inside the side walls 7 and 9, with which they are in intimate contact. The carrier provided on the inner side of the side wall 7 also accommodates the sprockets and other parts of the chain drives of these rollers originating from the sprocket on the lowermost shaft 37. When the door is closed, and the group 31 is in its forward position as indicated by broken lines, the roller 35 and the group of rollers 31 are in the position shown in FIG. 1 relative to the side walls 7 and 9. When the door 32 is opened in the direction B towards the position indicated in FIG. 1 by broken lines, the group of rollers 31 turns under the action of its own weight into the position 31A indicated by broken lines (FIG. 1). The arcuate length of the wall of group 31 exceeds half the entire length of the rear boundaries of each of the winding spaces 5, 6 and is about equal to the diameter of the winding space concerned.

The rear boundary of the winding space 6 is formed in an identical manner to that of the winding space 5, by groups of rollers 30 and 31 and a roller 35, which also extend only between the side walls 8 and 10 of the space. These rollers are driven through a drive casing 38 (FIGS. 2,3) which is in contact with the side wall 8 and which is comparable with the drive casing 36 of the space 5, and through a drive casing 39 on the outboard side of the side wall 8, comparable with the drive casing 33 for driving the rollers of the space 5. As stated above, the drive casings 38 and 39 are driven from the shaft 22A of the topmost roller of the group 24, which shaft extends into the top of the drive casing 39 at the top of the side wall 8. The group of rollers 31 of the winding space 6, like that of the winding space 5, is pivotable about a separate shaft 37, which extends only between the side walls 8 and 10. The side wall 8 of the winding space 6 (like the side wall 7), extends forwards up to the hindmost arcuate boundary of the arcuate frame 29 carrying on the side of the side wall 8 the shafts 22 of the rollers of the foremost of the winding space 6.

At the front side of the baler, below the drive casing 12, there is a beam 40 (FIGS. 4 and 5) which covers the whole width of the baler and is rigidly secured to the arcuate frames 29 disposed one on each side of the baler. From FIG. 5 it will be appreciated that the beam 40 is substantially channel-shaped or U-shaped having two limbs 41 which extend horizontally to the front from a vertical web 42. The larger dimension of the beam 40 is horizontal and extends transversely of the direction A. The limbs 41 are bent downwards and upwards respectively at their ends away from the web 42 and constitute flanges 43, which are vertical as shown in FIG. 5. The larger dimension of each flange 43 is horizontal and extends transversely of the direction A. The beam 40 is made from thick steel sheet. The front of the beam 40 is provided with a steel sheet beam 44, which as shown in the sectional view of FIG. 5 has substantially the same dimensions as the beam 40, but has flanges 45 which are slightly shorter than the flanges 43. The beams 40 and 44 are disposed so that they are symmetrical about a vertical plane between the flanges 43 and 45. The flanges 45 are in contact on one side with the outer faces of the flanges 43 and on the other side with the inner faces of strips 46, the larger dimension of which is horizontal and extends normal to the direction A. Between the strips 46 and the adjacent flanges 43 there are spacing strips 47, whose thickness shown in FIG. 5 is slightly larger than the thickness of the flanges 45 of the beam 44. The strips 47 are clamped by bolts 48 between the strips 46 and the flanges 43. In this way the flanges 45 and hence the whole beam 44 can slide in a direction transversely of the direction A between the flanges and the strips 46 so that the whole beam 44 is laterally displaceable with respect to the beam 40. The drawbar 11 is rigidly secured to the front of the beam 44. The length of the beam 44 is about half the length of the beam 40, the latter length being equal to the distance between the outer side walls 7 and 8 of the baler. The gearbox 17 of the pick-up device 4 is rigidly secured as shown in FIG. 4 to one end of the beam 44. The drive casing 12, together with the pick-up device 4 and the drawbar 11 is also fastened to the beam 44. However, the output shaft 15 of the drive casing 12 is journalled at one end in the arcuate frame 17A and at the other end in the side wall. The drive casing 12 together with the drawbar 11, the pick-up device 4, the drive casing 17 and the beam 44 is slidable along the shaft 15, which remains in place with respect to the side walls of the baler.

Near the side wall 7 there is a pivotal shaft 49 which is journalled in a vertical position in the end of the beam 40. One end of a hydraulic ram 50 is pivotable about the pivotal shaft 49, the other end of which is pivotably mounted on a vertical pivotal shaft 51 at the end of the beam 44 away from the side wall 7. By actuating the hydraulic ram 50 from the driver's seat of the tractor 1, the drawbar 11, the drive casing 12, the drive casing 17 and the entire pick-up device secured thereto can be displaced transversely of the direction A by displacing the beam 44 with respect to the beam 40, by which the drive casing 12 slides along the shaft 15, which supports the casing.

From FIGS. 1 to 3, it will be appreciated that above each chamber or winding space 5 and 6 there is a hydraulic ram 52 and 53 respectively, one end of each of which is pivotally connected by a horizontal transverse shaft to a support 54. The supports 54 of the two hydraulic rams 52 and 53 are mounted by means of a horizontal transverse beam 55 on the two side walls of the baler. The other, rear ends of the two hydraulic cylinders 52 and 53 are connected by supports 56 to transverse beams 57 and 58 respectively, the ends of which are fastened to the side walls 7 and 9 of the winding space 5 and to the side walls 10 and 8 of the winding space 6. As viewed on plan (FIGS. 2, 3) the centerlines of the rams 52 and 53 lie in the planes of symmetry of the winding spaces 5 and 6 respectively.

In operation, the baler is moved by the tractor 1 across a field of cut crop. The baler is set as shown in FIG. 2 and the pick-up device 4 is disposed adjacent the side wall 7. The baler is directed so that the pick-up device passes just over a swath 59 lying on the field. The pick-up device 4, driven by the auxiliary shaft 14, the drive casing 12, the shaft 15 and the drive casing 17, picks up the crop of the swath 59 and passes it through the inlet opening 28 (between the rollers 25 and 26) into the winding space 5 (FIG. 2). The group of rollers 24, the rollers 26 and 27, the roller 35, the group of rollers 31 and the group of rollers 30 are driven in the direction C. The wall 31 is in the position indicated by broken lines in FIG. 1. The crop coming from the pick-up device 4 to the winding space 5 is moved to the rear by the rollers 26, 27 and 35 and comes into contact with the forwardly turned group of rollers 31, which turns the crop upwardly and rolls it back towards the front so that the core of a bale is formed. As crop is introduced, the bale will grow and, as its diameter increases, it pushes the group of rollers 31 upwards in the direction D while forming hard layers of crop until, when the bale is almost complete, the group 31 reaches the position in which it joins the cylindrical boundary of the winding space 5 formed by the other rollers. When the whole winding space 5 is filled, the tractor driver is alerted by means of an end switch (not shown) actuated by the group of rollers 31 turning back in the direction D. The driver or the end switch actuates a binding device (not shown) which binds the bale turning in the winding space 5, for example, by a rope or twine, which is automatically cut off when binding has finished.

When the end switch produces the above-mentioned signal the tractor driver actuates the hydraulic ram 50 so that the assembly of drawbar 11, drive casing 12, drive casing 17 and pick-up device 4 is displaced with respect to the rest of the baler along the beam 40 and along the shaft 15 transversely of the direction A until the ram 50 reaches its other position (FIG. 3). In this end position the pick-up device is located directly in front of the winding space 6 (FIG. 3). This occurs while the tractor and the baler are in motion. While this is going on, the rest of the baler, other than the above-mentioned sliding parts, i.e. mainly the winding spaces 5 and 6 with their drives and boundaries, move over the ground and across the swath 59 transversely of the direction A. During this movement, the pick-up device continues to pick up crop from the swath 59.

Between the side wall 9 of the winding space 5 and the directly adjacent side wall 10 of the winding space 6 there is a cutting member formed by knives 60, whose cutting edges lie midway along the overall width of the inlet opening 28 so that, particularly during the lateral displacement of the pick-up device 4, the streams of crop are clearly separated, so that crop stalks cannot become tangled up near the front edges of the walls 9 and 10.

In the configuration shown in FIG. 3, the winding space 6 is filled in the same manner as described above for the winding space 5 and subsequently the formed bale is bound. Then the pick-up device 4 is again moved into the position shown in FIG. 2, in which the part of the baler located behind the pickup device 4 is displaced transversely of the tractor and the pick-up device by the actuation of the hydraulic ram 50.

In this way the winding space 6 is filled while the bale in the winding space 5 is being bound. The time required for binding may be approximately of the same order or magnitude as the time required for forming the bale so that the production of bales is neither delayed nor disturbed by binding the bales. The converse is also true; while a bale is being formed in the space 5, a formed bale is being bound in the space 6.

When a bale is bound in one of the spaces 5 or 6 and the twine or wire has been cut off, the respective hydraulic ram 52 or 53 is actuated by the tractor driver so that the door 32 of the space 5 or 6 is opened. The door of the space in which a bale is being formed remains closed, of course. By opening the door 32 the side walls of the winding space concerned are moved along up to the rear boundary of the arcuate frame 29 so that the whole side wall of the space concerned is turned upwardly and rearwardly. Since the completed bale accommodated in this space is clamped between the side walls, it is drawn by the side walls out of the winding space as the door turns so that, when the door is turned up the bale drops onto the ground under its own weight. The delivery of the bale from between the side walls is assisted by the fact that the group of rollers 31 falls forward when the door is tilted up so that its weight bears on the top of the bale, which thus drops readily. The wall 31 thus also serves as an expulsion means for a bale of crop. When the bale is discharged and the door is closed, the group of rollers (position 31A in FIG. 1) is in the position suitable for winding the core of a new bale. As viewed in the direction A, the winding spaces or chambers 5 and 6 are located side by side and have a coinciding boundary, as shown in the side view of FIG. 1.

In the transport position of the baler, the pick-up device 4 is disposed by means of the ram 50 centrally across the width of the baler.

In the embodiment of FIGS. 1 to 5, the winding spaces have a diameter of about 150 centimeters, while the overall width of the two winding spaces is about 240 centimeters.

In the second embodiment shown in FIGS. 6 to 9, the baler again comprises two aligned winding spaces 5 and 6 having boundaries in the form of crop-displacing rollers driven by chain drives. These rollers and groups of rollers and their arrangements, the construction of the two doors 32 and the relative rams for opening the doors are similar to those of the preceding embodiment.

Figure 9:
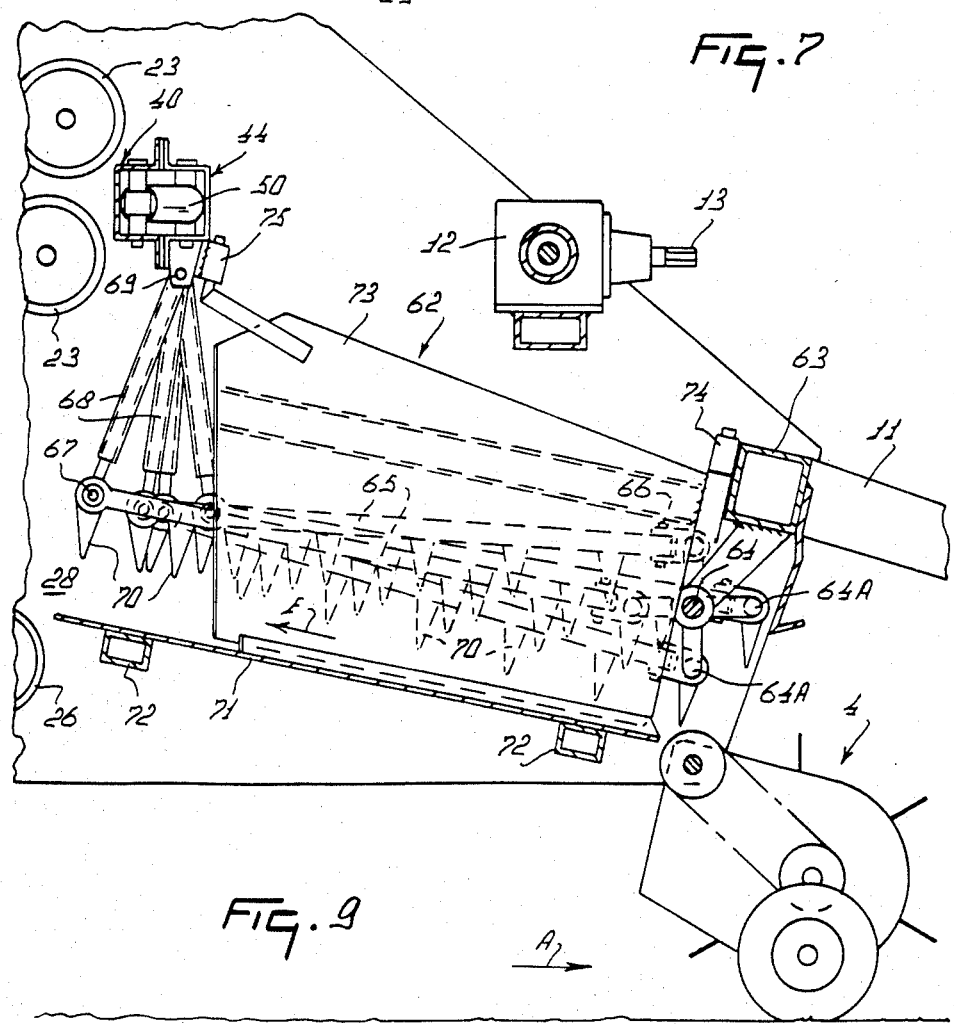
FIG. 9 is a sectional view taken on the lines IX—IX in FIG. 8.

The pick-up device 4 has a width, as in the preceding embodiment, equal to the width of one of the winding spaces 5 or 6, but in this embodiment is stationary with respect to therest of the baler and is dispcsed symmetrically about a vertical central longitudinal plane 61 passing between the side walls 9 and 10 of the two winding spaces. In this embodiment the pick-up device 4 is situated farther ahead of the inlet opening 28 than in the first embodiment. Between the pick-up device 4 and the inlet opening 28 of one of the two winding spaces 5 or 6 there is a displaceable crop feeding device 62, which conveys the crop picked up by the pick-up device 4 either to the inlet opening 28 of the winding space 5 or to the inlet opening 28 of the winding space 6. Between the side walls 7 and 8 is again mounted the beam 40, with respect to which the beam 44 can slide as described above with reference to FIG. 5. The length of the beam 44, measured transversely of the direction A, is about half the distance between the side walls 7 and 8, whereas the beam 40 covers the whole distance between the side walls 7 and 8. The beam 44 is displaceable with respect to the beam 40 in the same manner as is described with reference to the first embodiment by means of the hydraulic ram 50 (FIGS. 8 and 9). The beams 40 and 44 are, however, situated higher up than in the preceding embodiment, that is to say that they are approximately at the same level as the drive casing 12 disposed some distance in front of them. The beams 40 and 44 are a small distance ir front of the two lowermost rollers of the group 24.

Between the forwardly prolonged side walls 7 and 8, in a region obliquely in front of and below the drive casing 12, there is a horizontal transverse beam 63, which rigidly interconnects the front ends of the prolonged side walls 7 and 8. The drawbar 11 is fastened at the middle to this transverse beam 63. Obliquely below and behind the transverse beam 63 a crankshaft 64 is journalled between the two side walls. The crankshaft 64 extends horizontally and transversely of the direction A (FIGS. 8 and 9), and, together with the pick-up device 4, is driven by means of chain drives (FIG. 6) from the output shaft of the drive casing 12. The crankshaft 64 has four cranks 64A at equal intervals, which are regularly spaced, as shown in the plan view of FIG. 8, along the width of the pick-up device 4. The cranks 64A are successively shifted at relative angles of 90°. Each of the four cranks 64A, which rotates parallel to the plane 62, drives a beam 65, which is connected by a vertical pivotal shaft 66 (FIG. 8) with the associated cranks. Each beam 65 is inclined upwardly rearwardly and laterally from its pivotal shaft 66. The rear end of each beam 65 is pivotally connected by a horizontal pivotal shaft 67 (FIG. 9), extending transversely of the plane 61, with an upwardly extending arm 68. The four arms 68 of the four beams 65 are pivotable about a common pivotal shaft 69, which is horizontal and normal to the plane 61. As viewed on plan, the beam 65 forms part of a pivotable parallelogram linkage. The shaft 69 is fastened to the underside of the slidable beam 44. Each beam 65 has on its underside a row of downwardly projecting teeth or tines 70 which extend to a position a short distance above a floor plate 71. The floor plate 71 is supported by transverse beams 72, which are carried by the front prolongations of the side walls 7 and 8. As shown in the plan view of FIGS. 7 and 8, the floor plate 71 has the shape of an isosceles trapezium of which the length of the short parallel side corresponds to the working width of the pick-up device 4. The longparallel side of the floor plate 71 covers the whole width of the baler. The region in which the beams 65 provided with tines 70 are operative is bounded at the sides by side plates 73 which extend approximately perpendicular to the floor plate 71 and are pivotable relatively to the beam 63 about hinges 74 directed at right angles to the floor plate 71. The lower edges of the two spaced, parallel, upwardly directed side plates 73 are a short distance above the top surface of the floor plate 71. At the corners nearest the beam 44, the two plates 73 are pivotably connected to the beam 44 by means of pivots 75 which are parallel to the pivots 74.

When the cranskshaft 64 is driven, the beams 65 with their rows of teeth or tines 70 are driven so that the tip of each tooth describes a closed path which includes a portion in which the teeth move in the direction of the arrow E in FIG. 9.

Figure 7:
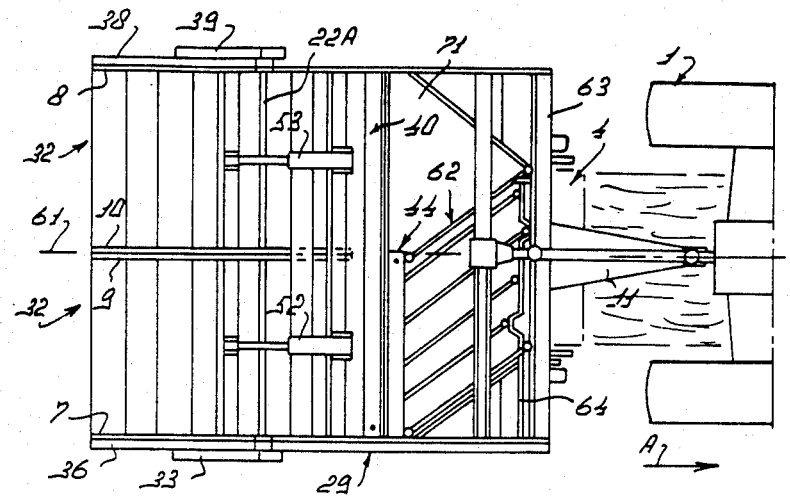
FIG. 7 is a plan view of the baler of FIG. 6 attached to a tractor.

During operation the baler is moved by the tractor 1 as shown in FIG. 7, the pick-up device 4 being in a fixed position relative to the winding spaces 5 and 6. The pick-up device 4 picks up crop from the swath 59. The picked up crop is moved by the pick-up device 4 to the front of the floor plate 71, and the teeth moving in the direction of the arrow E along a continuous path, move the crop rearwardly along the plate 71 towards the inlet opening 28. In the position shown in FIG. 7 the beam 44 lies directly in front of the inlet opening of the winding space 5. A bale is consequently wound in the space 5 in the same manner as described for the first embodiment. When the bale fills the space 5 and binding of the bale begins, the hydraulic ram 50 is actuated by the tractor driver so that the beam 44 slides with respect to the beam 40 in a direction at right angles to the plane 61 until the beam 44 lies in front of the inlet opening 28 of the winding space 6. Then the beams 65 with their rows of teeth 70 turn about the pivots 66 and the side plates 73 turn about the pivots 74 and 75 with the beam 44 so that the crop deposited by the pick-up device 4 on the plate 71 is moved by the teeth over the path E into the inlet opening 28 of the space 6. The required turn of the crop feeding mechanism is relatively slight because the winding spaces 5, 6 are in line with one another. While a bale is being wound in the space 6, the bale in the space 5 is bound. During continued winding of the bale in the space 6 the bound bale in the space 5 is discharged by opening the door 32 behind the space 5. Then winding of the bale in the space 6 is ready or almost ready. When the end switch actuated by the wall 31 of the space 6 passes a signal to the driver, indicating that the bale is ready, the cylinder 50 is again actuated by the driver so that the beam 44 together with the beams 65 and the teeth 70 is shifted back into the position shown in FIG. 8, in which the space 5 is again supplied with crop and the wound bale in the space 6 is bound and discharged. The beams 65, as viewed on plan, constitute together with the crankshaft 64 and the beam 44 a parallelogram-shaped linkage which constitues in a simple manner the displaceable conveying member 62.

Although various features of the balers described and illustrated in the drawings, will be set forth in the following claims as inventive features, the invention is not necessarily limited to these features and may encompass all of the features that have been described both individually and in various combinations.

Having described my invention, what I claim as new and to be secured by Letters Patent of the United States is:

1. A baler comprising two chambers, a pick-up device for picking up crop from the ground, said chambers being situated laterally side by side and adapted for forming substantially cylindrical bales, bale binding actuation means for actuating a binding device in each said chamber when a bale is formed therein which is ready to be bound, and a crop feeding mechanism provided between said pick-up device and said chambers, said crop feeding mechanism being operative selectively to feed crop to fill one said chamber sufficiently to actuate said bale binding actuating means of said one chamber and then to feed crop to the other said chamber to the extent and in a manner that a formed bale in said one chamber is being bound while a bale is being formed in said other chamber and vice versa, said crop feeding mechanism comprising movable beams provided with rows of downwardly projecting teeth or tines, the front ends of said beams being adjacent said pick-up device and the rear ends of said beams being adjacent an inlet opening of one of said chambers, the rear ends of said beams being displaceable transversely of the normal direction of operative travel of the baler from the inlet opening of one of said chambers to that of the other said chamber.

2. A baler comprising two chambers, a pick-up device for picking up crop from the ground, said chambers being situated laterally side by side and adapted for forming substantially cylindrical bales, bale binding actuation means for actuating a binding device in each said chamber when a bale is formed therein which is ready to be bound, and a crop feeding mechanism provided between said pick-up device and said chamber, said crop feeding mechanism being operative selectively to feed crop to fill one said chamber sufficiently to actuate said bale binding actuating means of said one chamber and then to feed crop to the other said chamber to the extent and in a manner that a formed bale in said one chamber is being bound while a bale is being formed in said other chamber and vice versa, said crop feeding mechanism comprising movable beams provided with rows of downwardly projecting teeth or tines, the rear ends of said beams being pivotally connecting to arms which are displaceable together transversely of the normal direction of operative travel of the baler.

3. A baler as claimed in claim 2 in which said arms are displaced by hydraulic power from a tractor drawing the baler.

4. A baler comprising two chambers, a pick-up device for picking up crop from the ground, said chambers being situated laterally side by side and adapted for forming substantially cylindrical bales, bale binding actuation means for actuating a binding device in each said chamber when a bale is formed therein which is ready to be bound, and a crop feeding mechanism provided between said pick-up device and said chambers, said crop feeding mechanism being operative selectively to feed crop to fill one said chamber sufficiently to actuate said bale binding actuating means of said one chamber and then to feed crop to the other said chamber to the extent and in a manner that a formed bale in said one chamber is being bound while a bale is being formed in said other chamber and vice versa, said crop feeding mechanism comprising movable beams provided with rows of downwardly projecting teeth or tines, said beams forming parts of a parallelogram linkage pivotal about upwardly extending pivotal axis.

* * * * *